(12) United States Patent
Kobayashi

(10) Patent No.: US 7,430,403 B2
(45) Date of Patent: Sep. 30, 2008

(54) METHOD AND APPARATUS FOR HYSTERESIS CONTROL

(75) Inventor: Shoichi Kobayashi, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 612 days.

(21) Appl. No.: 11/067,705

(22) Filed: Mar. 1, 2005

(65) Prior Publication Data

US 2006/0234651 A1 Oct. 19, 2006

(51) Int. Cl.
*H04B 17/02* (2006.01)

(52) U.S. Cl. ............... 455/136; 455/138; 455/127.2; 455/245.1

(58) Field of Classification Search ................. 455/91, 455/69, 522, 70, 126, 127.1, 127.2, 127.5, 455/136, 138, 245.1, 232.1, 239.1, 240.1, 455/250.1, 277.1; 370/236, 255, 230.1, 416, 370/429
See application file for complete search history.

(56) References Cited

U.S. PATENT DOCUMENTS

| | | | | |
|---|---|---|---|---|
| 6,330,455 B1 * | 12/2001 | Ichihara | ................. | 455/522 |
| 6,539,234 B1 * | 3/2003 | Hiramatsu et al. | ........... | 455/522 |
| 7,298,703 B1 * | 11/2007 | Rose | ................. | 370/236 |
| 2003/0216820 A1 * | 11/2003 | Messina | .............. | 700/56 |

FOREIGN PATENT DOCUMENTS

| | | |
|---|---|---|
| JP | 5-175763 | 7/1993 |
| JP | 8-115068 | 5/1996 |
| JP | 9-223946 | 8/1997 |
| JP | 2001-292079 | 10/2001 |
| JP | 2003-018027 | 1/2003 |

OTHER PUBLICATIONS

English Language Abstract of JP 8-115068.
English Language Abstract of JP 9-223946.
English Language Abstract of JP 2001-292079.
English Language Abstract of JP 2003-018027.
English language Abstract of JP 5-175763.

* cited by examiner

*Primary Examiner*—John J. Lee
(74) *Attorney, Agent, or Firm*—Greenblum & Bernstein, P.L.C.

(57) ABSTRACT

A hysteresis control method for a control system includes setting an arbitrary reference value for an existing position of a control width and calculating a difference between a present input value and the arbitrary reference value. A direction of increase/decrease from a control value and an input value variation width are calculated. A control value is calculated for the present input value time from the calculated input value variation width and the calculated direction of increase/decrease.

17 Claims, 9 Drawing Sheets

METHOD AND APPARATUS FOR HYSTERESIS CONTROL

BACKGROUND OF THE INVENTION

1. Field of the Invention

The present invention relates to a method and apparatus for hysteresis control.

2. Description of the Related Art

As an example of a hysteresis control apparatus, one disclosed in the Unexamined Japanese Patent Publication No. 8-115068 (see paragraph numbers 0009 to 0020, FIG. 1 to FIG. 3) is known. An overview of the hysteresis control apparatus will be explained with reference to FIG. 1 below. FIG. 1 is a block diagram showing an example of the configuration of a conventional hysteresis control apparatus.

The hysteresis control apparatus shown in FIG. 1 is provided with a first signal comparator 801 that compares a relationship in magnitude between an input signal value and set value (input signal value>set value), a second signal comparator 802 that compares a relationship in magnitude between an input signal value and set value (input signal value<set value), a control circuit 803 that processes the comparison results at the first signal comparator 801 and second signal comparator 802 and a signal switching circuit 804 that outputs the output value of the control circuit 803 with a hysteresis characteristic added thereto.

It should be noted here that, for example, in a mobile communication system, transmit power control is performed to solve a near-far problem. This transmit power control involves a plurality of control sections, each of which constitutes an input value operating variation width. FIG. 2 is a time chart illustrating a control mode which is assumed when hysteresis control is performed using the hysteresis control apparatus shown in FIG. 1 in such a control system having a plurality of control sections.

FIG. 2 shows four control sections a, b, c and d. The control section a is an input value operating variation width including a hysteresis control section A. The control section b is an input value operating variation width including hysteresis control sections A and B. The control section c is an input value operating variation width including hysteresis control sections B and C. The control section d is an input value operating variation width including the hysteresis control section C.

In the hysteresis control section A, a comparison is made at a maximum value in the control section a and a minimum value in the control section b to decide whether or not to make a transition to the neighboring control section. In the hysteresis control section B, a comparison is made at a maximum value in the control section b and a minimum value in the control section c to decide whether or not to make a transition to the neighboring control section. In the hysteresis control section C, a comparison is made at a maximum value in the control section c and a minimum value in the control section d to decide whether or not to make a transition to the neighboring control section.

However, according to the hysteresis control method using the above described conventional hysteresis control apparatus, it is necessary to perform two comparisons in the hysteresis control sections and change the set values until control values (output values) in the control sections to which a transition is to be made are obtained. Furthermore, there is a problem that in order to know a variation in a control section, it is not possible to detect an input value variation width extending over the control sections unless a difference from the immediately preceding control section is calculated after a desired control value is determined.

SUMMARY OF THE INVENTION

It is an object of the present invention to provide a method and apparatus for hysteresis control, when there is a plurality of control sections, each of which constitutes an input value operating variation width having hysteresis control sections at both ends, requiring only one comparison in each hysteresis control section, capable of calculating control values without the need to change set values and detecting an input value variation width extending over the control sections while performing hysteresis control.

According to an aspect of the present invention, a hysteresis control method in a control system having a plurality of control sections which are input value operating variation widths having hysteresis control sections at both ends comprises the steps of setting an arbitrary reference value which serves as a reference for deciding an existing position of a control width in the control section, calculating a difference between an input value this time and the arbitrary reference value in the control section to which a preceding input value belongs, generating position information indicating a positional relationship between the input value this time and the arbitrary reference value in the control section to which the preceding input value belongs from the difference result calculated, determining a direction of increase/decrease from a control value of the control section to which the preceding input value belongs from the position information, calculating an input value variation width extending over control sections from the difference result and the control width in the control section to which the preceding input value belongs, and calculating a control value for the input value this time from the input value variation width and the direction of increase/decrease.

According to anotner aspect of the present invention, a hysteresis control apparatus comprises a reference value setting section that sets an arbitrary reference value which serves as a reference for deciding an existing position of a control width in a control section of a plurality of control sections which are input value operating variation widths having hysteresis control sections at both ends, a difference detection section that calculates a difference between an input value this time and the arbitrary reference value in the control section to which a preceding input value belongs, a position information generation section that generates position information indicating a positional relationship between the input value this time and the arbitrary reference value in the control section to which the preceding input value belongs from the difference result calculated by the difference detection section, a control width selection section that selects the control width in the control section to which the preceding input value belongs, an input value variation width calculation section that calculates an input value variation width extending over control sections from the difference result calculated by the difference detection section and the control width selected and output by the control width selection section, and a control value output section that calculates a control value for the input value this time from the input value variation width and a direction of increase/decrease from a control value in the control section to which the preceding input value belongs obtained from the position information.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, embodiments of the present invention will be explained in detail below.

Embodiment 1

Figure 1:
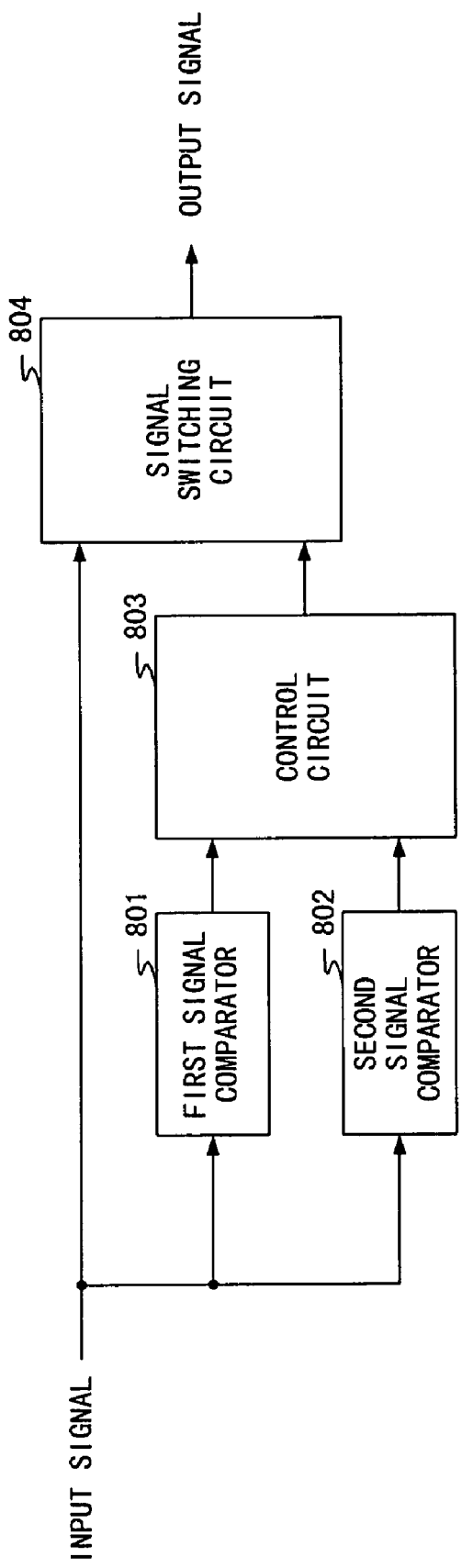
FIG. 1 is a block diagram showing an example of the configuration of a conventional hysteresis control apparatus.
Figure 2:
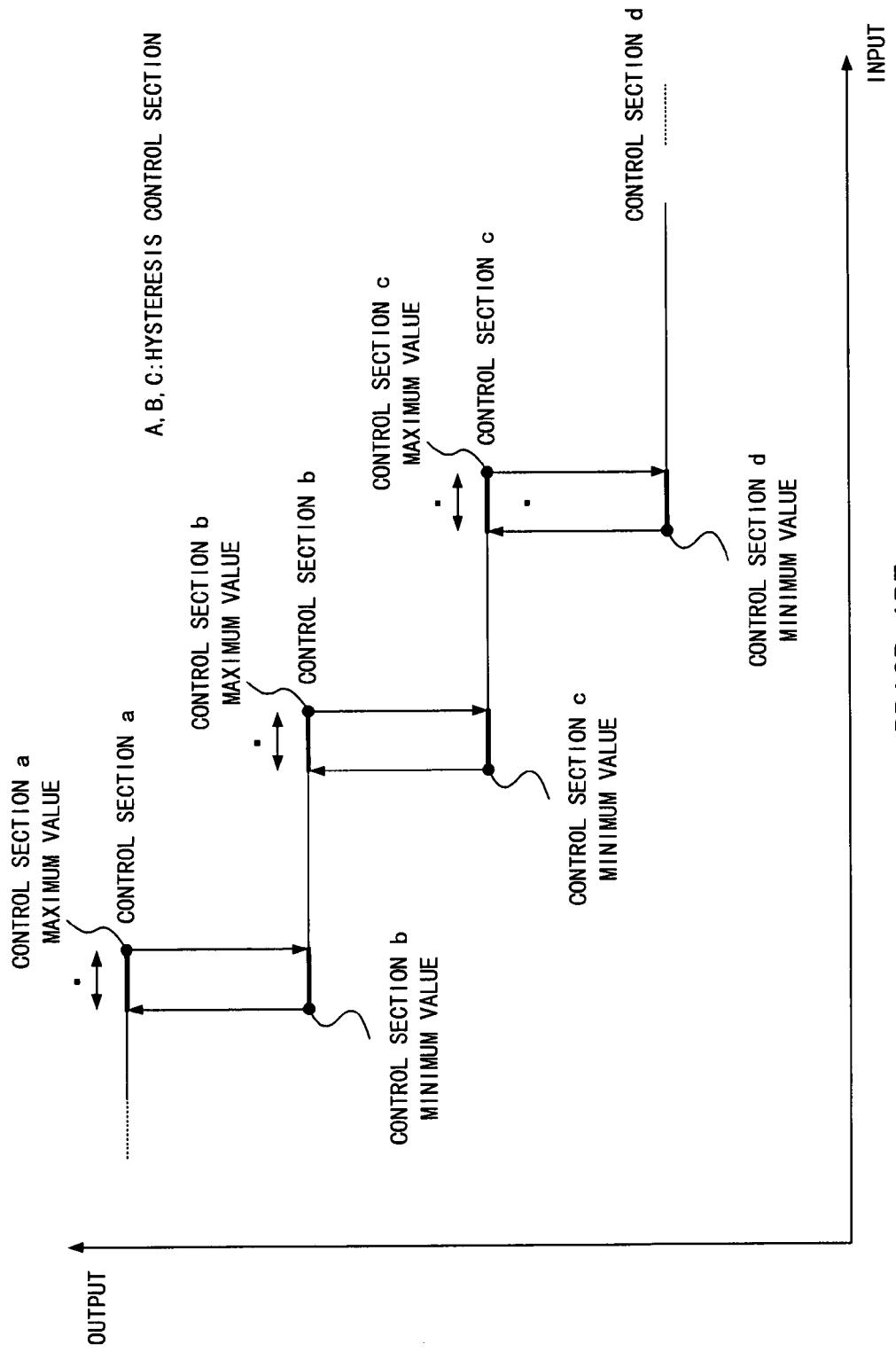
FIG. 2 is a time chart illustrating a control mode assumed when hysteresis control is performed in a control system having a plurality of control sections using the hysteresis control apparatus shown in FIG. 1.
Figure 3:
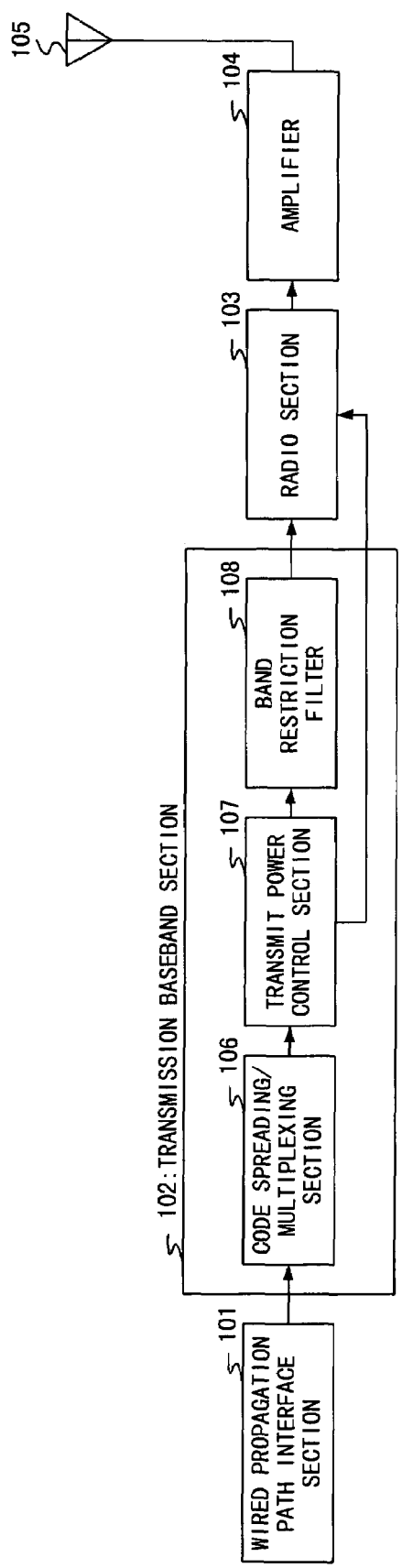
FIG. 3 is a block diagram showing an example of the configuration of a communication apparatus using a hysteresis control method according to Embodiment 1 of the present invention for transmit power control.

FIG. 3 is a block diagram showing an example of the configuration of a communication apparatus using a hysteresis control method according to Embodiment 1 of the present invention for transmit power control.

The communication apparatus shown in FIG. 3 is provided with a wired propagation path interface section 101, a transmission baseband section 102 connected to the output of the wired propagation path interface section 101, a radio section 103 connected to the output of the transmission baseband section 102, an amplifier 104 that amplifies the output of the radio section 103 and a transmission antenna 105 that radiates out the signal amplified by the amplifier 104 into the air.

The transmission baseband section 102 is provided with a code spreading/multiplexing section 106 that receives the output of the wired propagation path interface section 101, a transmit power control section 107 that receives the output of the code spreading/multiplexing section 106 and controls the radio section 103 and a band restriction filter 108 that transmits the output of the transmit power control section 107 to the radio section 103.

In the communication apparatus in the above described configuration, transmission data introduced by the wired propagation path interface section 101 from a wired propagation path is input to the transmission baseband section 102. The transmission data input to the transmission baseband section 102 is code-spread and code-multiplexed into transmission data by the code spreading/multiplexing section 106, subjected to power control by the transmit power control section 107, subjected to band restriction by the band restriction filter 108 and output.

The transmission data output from the transmission baseband section 102 is converted to an analog signal by the radio section 103, with transmit power controlled according to an instruction from the transmit power control section 107, amplified by the amplifier 104 and output from the transmission antenna 105.

Here, the transmit power control section 107 determines to which control section the input value this time belongs from a difference between the input value this time and an arbitrary reference value in the immediately preceding (hereinafter referred to as "preceding") input value and determines the control value corresponding to the input value this time using the procedure shown in FIG. 4 and FIG. 5.

Figure 4:
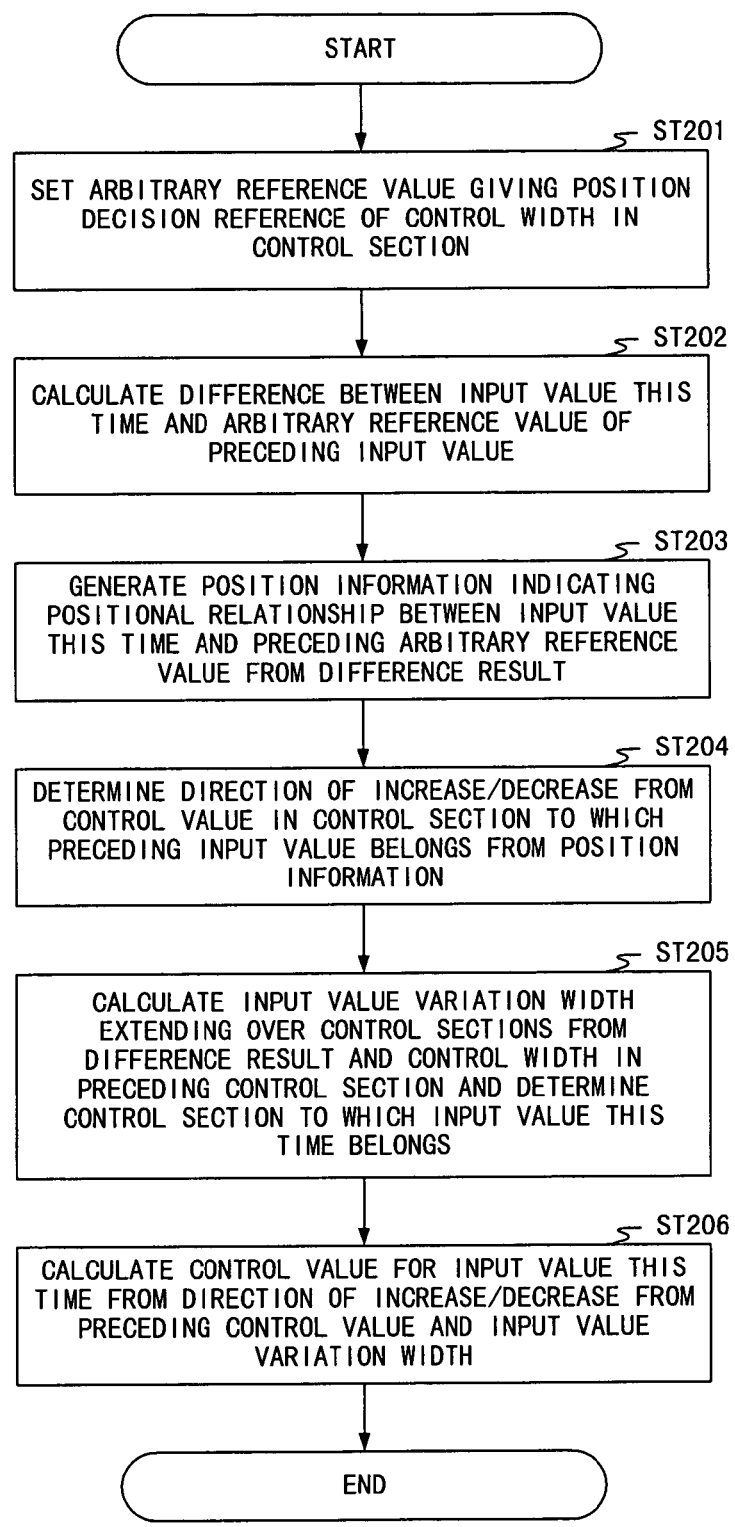
FIG. 4 is a flow chart illustrating a hysteresis control operation carried out by the transmit power control section shown in FIG. 3.
Figure 5:
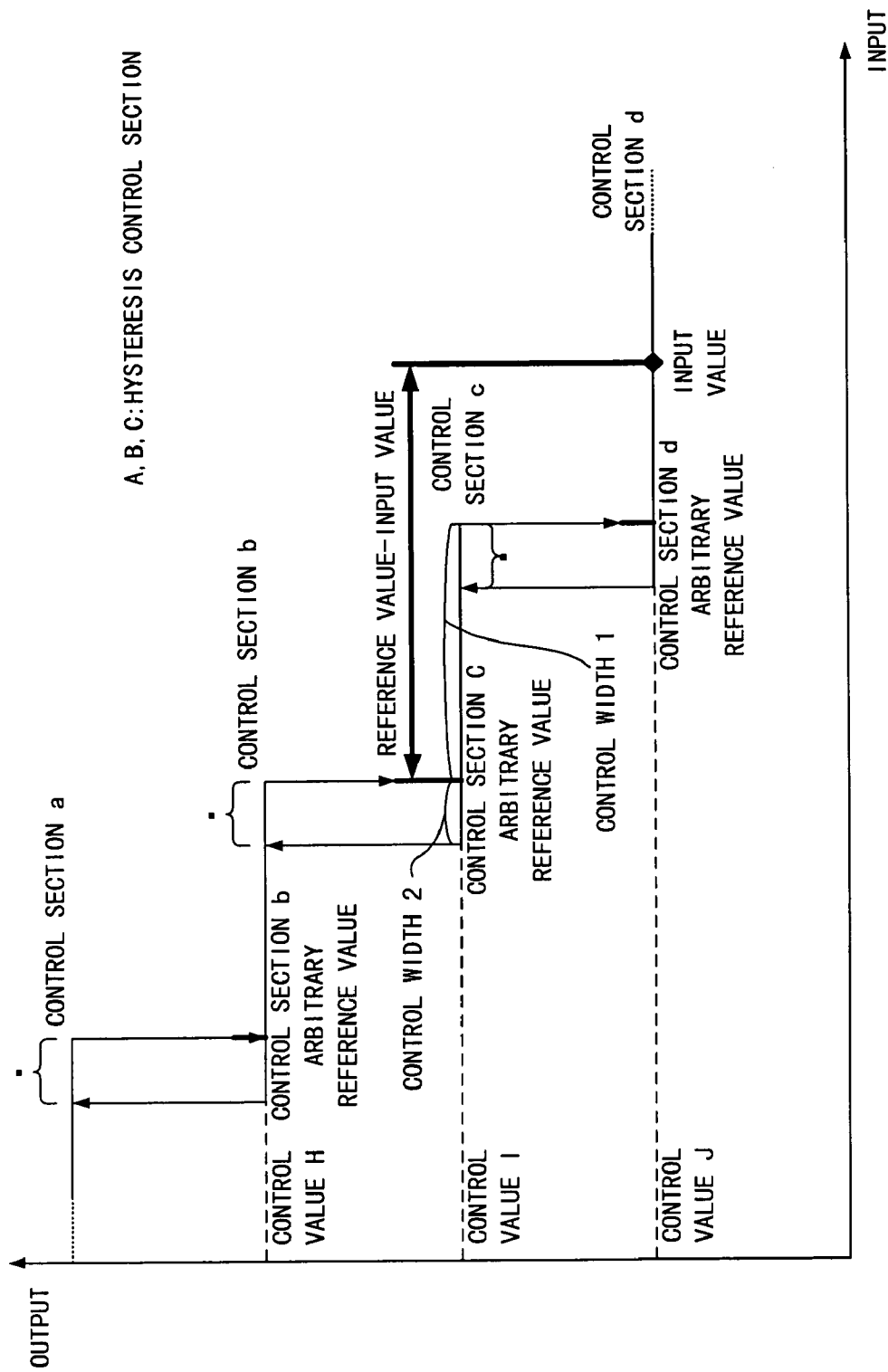
FIG. 5 is a time chart specifically illustrating the hysteresis control method shown in FIG. 4.

With reference to FIG. 4 and FIG. 5, the hysteresis control method used by the transmit power control section 107 to control transmit power will be explained. FIG. 4 is a flow chart which illustrates the hysteresis control operation carried out by the transmit power control section shown in FIG. 3. FIG. 5 is a time chart specifically illustrating the hysteresis control method shown in FIG. 4.

In FIG. 4, in step ST201, an arbitrary reference value is set which gives a reference for deciding the existing position of a control width in a control section which corresponds to an input value operating variation width having hysteresis control sections at both ends. This will be explained with reference to FIG. 5.

FIG. 5 shows four control sections a, b, c and d as control sections which correspond to input value operating variation width having hysteresis control sections at both ends. The control section b has a control value (output value) H, the control section c has a control value (output value) I and the control section d has a control value (output value) J, but as shown in the control section c, an arbitrary reference value is set at a position where each control section is divided into a control width 1 and control width 2. Here, A, B and C shown in the control sections a, b and c in FIG. 5 are hysteresis control sections.

In FIG. 5, each control section has an arbitrary width and the control width 1 is different from the control width 2 (control width 1>control width 2 in the example in the figure), but in another case where the control sections have the same width, each control section may have the two equal control widths (see Embodiment 3 which will be described later) or a common arbitrary reference value may be set at the center position of all control sections so that the width of each control section is set to the control width (see Embodiment 4 which will be described later).

In step ST202, a difference between the input value this time and an arbitrary reference value in the control section to which the preceding input value belongs is calculated. In FIG. 5, the arbitrary reference value in the preceding input value is an arbitrary reference value of the control section c and FIG. 5 shows that the input value this time is subtracted from this arbitrary reference value (that is, difference=reference value–input value). However, though FIG. 5 shows an image in which the input value this time exists within the control section d, the "value of the input signal" is simply known in actuality and it is unknown to which control section the input value belongs.

In step ST203, position information indicating a positional relationship between the input value this time and the arbitrary reference value in the control section to which the preceding input value belongs is generated from the difference result obtained in step ST202. In the example shown in FIG.

5, if the "reference value−input value" which is the difference result is "positive", it is detected that the input value this time is located on the side where control width 2 exists (on the side where the input value is smaller than the arbitrary reference value of the control section c in the example shown in the figure) and if it is "negative", it is detected that the input value this time is located on the side where control width 1 exists (on the side where the input value is greater than the arbitrary reference value of the control section c in the example shown in the figure). Such position information is generated in this step.

In step ST204, a direction of increase/decrease is determined from the control value in the control section to which the preceding input value belongs from the position information generated in step ST203.

In step ST205, an input value variation width which extends over the control sections is obtained from the difference result obtained in step ST202 and the control width in the control section to which the preceding input value belongs and the control section to which input value this time belongs is determined. Here, when the control section consists of two control widths, the control width in the control section to which the preceding input value belongs is one of the control widths determined by the position information. When the control section consists of one control width, the control width is always that one control width irrespective of the position information.

The input value variation width which extends over the control sections can be obtained using the following two methods:

(1) First, as the first method, it is possible to repeatedly subtract the control width determined by, for example, position information from the first difference result and obtain an input value variation width from the number of subtractions when the first subtraction result falls below the control width (see Embodiments 2 to 4 which will be described later).

(2) Furthermore, as the second method, it is possible to divide the first difference result by the control width determined by, for example, the position information and use the division result as the input-value variation width (see Embodiment 5 which will be described later).

Here, the first difference result refers to a difference between an arbitrary reference value in the control section to which the preceding input value belongs and the input value this time.

The case where the input value variation width which extends over the control sections is obtained using the method in (1) will be explained with an example shown in FIG. 5. When the input value this time is located on the side on which the control width 1 in the control section c exists, one subtraction results in the second difference result<control width 1, and therefore the control section to which the input value this time belongs is determined to be the control section d. Furthermore, when the input value this time is located on the side on which the control width 2 in the control section c exists, the control section to which the input value this time belongs is determined as the control section b or control section a depending on the number of subtractions. Here, the second difference result means the subtraction result obtained by repeatedly subtracting a specified control width from the first difference result.

In step ST206, a control value (output value) corresponding to the input value this time is obtained from the direction of increase/decrease from the control values in the control section to which the preceding input value belongs obtained in step ST204 and the input value variation width obtained in step ST205.

In the example shown in FIG. 5, when the preceding control section c makes a transition to the control section d, a calculation in the decreasing direction is applied to the control value I and the control value J is obtained and when the preceding control section c makes a transition to the control section b, a calculation in the increasing direction is applied to the control value I and the control value H is obtained.

In this way, according to the hysteresis control method of this embodiment, in a control system including a plurality of control sections which are input value operating variation widths having hysteresis control sections at both ends, arbitrary reference values which become references for deciding the existing positions of control widths in the control section are set, a difference between the input value this time and the preceding input value is determined, the positional relationship between the input value this time and arbitrary reference value of the preceding input value is detected from the difference result, the input value variation width extending over the control sections are detected from the difference result and the control width in the preceding control section, a calculation is made on the control value (output value) in the preceding input value using the direction of increase/decrease from the control value in the preceding input value obtained from the detected positional relationships and input value variation width and the control value (output value) on the input value this time is obtained, and therefore it is possible to decide to which control section the input value this time belongs by a single comparison operation. Furthermore, the set value need not be changed, either and it is thereby possible to simplify the apparatus for performing the hysteresis control method of this embodiment. Furthermore, it is also possible to detect the input value variation width extending over the control sections simultaneously.

The apparatus for implementing the above described hysteresis control method will be explained more specifically below.

Embodiments 2 to 4 show the case where the control width is subtracted from the difference result and the input value variation width is calculated from the number of subtractions until the subtraction result falls below the control width as the method for calculating the input value variation width extending over the control sections. That is, by repeating subtractions of the control width from the difference result until it falls below the control width, it is possible to calculate the input value variation width from the number of subtractions.

Embodiment 2

Embodiment 2 will describe a case where when the input value operating variation width is an arbitrary width in a plurality of control sections, respective arbitrary reference values are set at a position where each control section is divided into a first control width and second control width.

Figure 6:
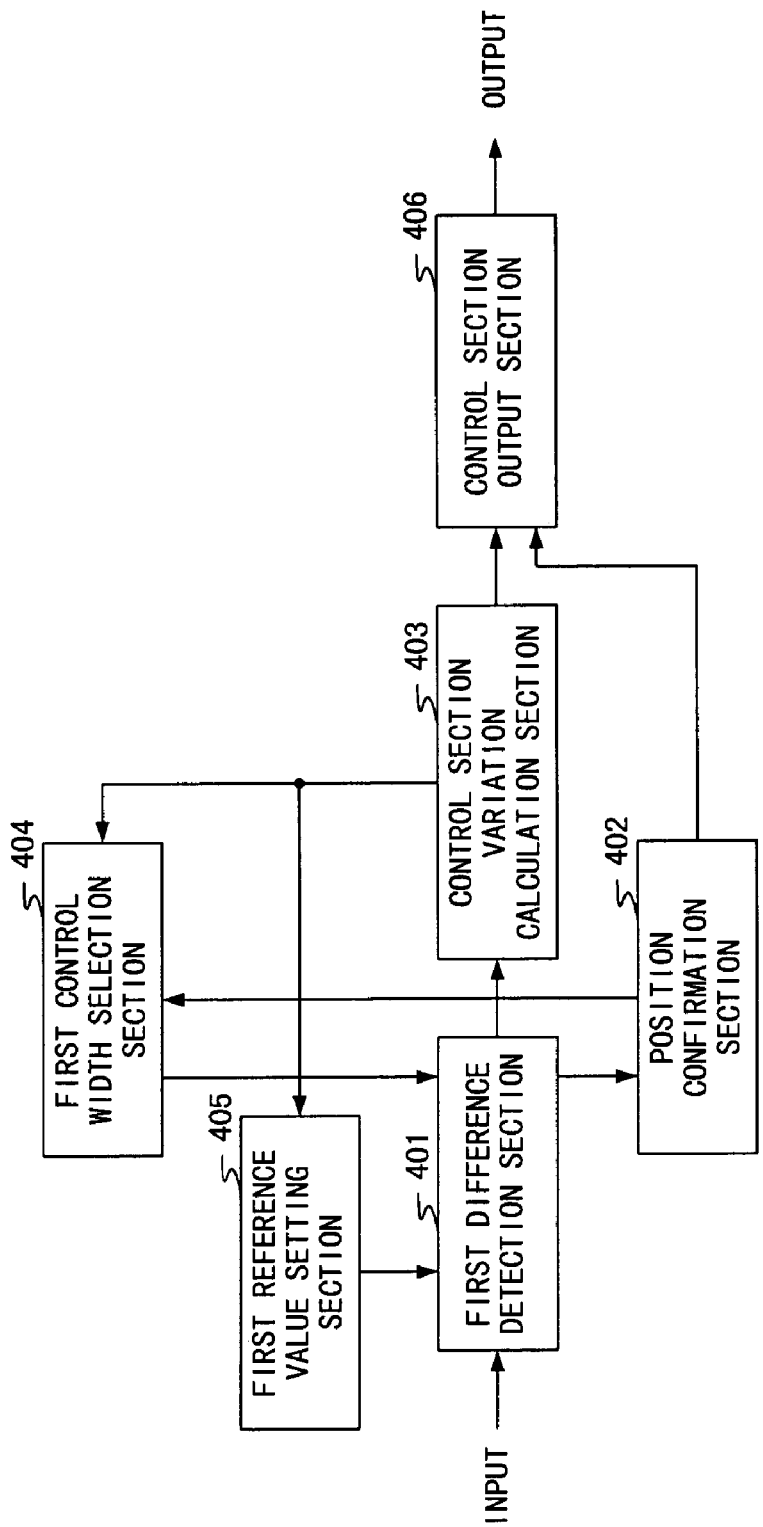
FIG. 6 is a block diagram showing the configuration of a hysteresis control apparatus according to Embodiment 2 of the present invention.

FIG. 6 is a block diagram showing the configuration of a hysteresis control apparatus according to Embodiment 2 of the present invention.

The hysteresis control apparatus shown in FIG. 6 is provided with a first difference detection section 401 that determines a difference between an input value this time and an arbitrary reference value in the control section to which the preceding input value belongs, a position confirmation section 402 that detects position information indicating a positional relationship between the input value this time and the arbitrary reference value based on the difference result from the first difference detection section 401, a control section variation calculation section 403 that detects how many control section variations have taken place from the difference result at the first difference detection section 401 and outputs the control section information, a first control width selection section 404 that selects the control width (control width 1 or control width 2 shown in FIG. 5) based on the control section information from the control section variation calculation section 403 and position information from the position confirmation section 402 and outputs the control width to the first difference detection section 401, a first reference value setting section 405 that sets an arbitrary reference value (see FIG. 5) determined in the control section based on the control section information from the control section variation calculation section 403 and outputs the arbitrary reference value to the first difference detection section 401 and a control section output section 406 that determines and outputs the control value this time from the direction of increase/decrease from the preceding control value indicated by the position information from the position confirmation section 402 and variation width determined by the control section variation calculation section 403.

The operation of the hysteresis control apparatus in the above described configuration will be explained below.

Various input values are input to the first difference detection section 401. Every time an input value is input, the first difference detection section 401 captures an arbitrary reference value in the control section to which the preceding input value output from the first reference value setting section 405 belongs, calculates a difference between the arbitrary reference value and input value this time (first difference result) (see FIG. 5) and outputs the difference to the position confirmation section 402.

When the position confirmation section 402 receives the first difference result from the first difference detection section 401, it obtains position information (see FIG. 5) indicating the positional relationship between the arbitrary reference value in the control section to which the preceding input value belongs and input value this time from the first difference result and outputs the position information obtained to the first control width selection section 404 and the control section output section 406.

Furthermore, after obtaining the first difference result, the first difference detection section 401 repeatedly subtracts the control width output by the first control width selection section 404 from the first difference result and when this subtraction result (second difference result) falls below the control width, it outputs the number of subtractions and the second difference result to the control section variation calculation section 403.

The control section variation calculation section 403 selects the corresponding control section from the number of subtractions and decides whether the second difference result is below the control width in the selected control section or not. Then, when the decision result shows that the second difference result is below the control width in the selected control section, the control section variation calculation section 403 gives the control section information indicating the selected control section to the first control width selection section 404, first reference value setting section 405 and control section output section 406. On the other hand, when the decision result shows that the second difference result is not below the control width in the selected control section, the control section variation calculation section 403 gives the control section information indicating the preceding control section to the first control width selection section 404, first reference value setting section 405 and control section output section 406.

The first control width selection section 404 selects the control width in the control section based on the control section information from the control section variation calculation section 403 and position information from the position confirmation section 402 and outputs the selected control width to the first difference detection section 401. The first difference detection section 401 uses the control width for the next input value.

The first reference value setting section 405 receives the control section information from the control section variation calculation section 403, sets an arbitrary reference value in the control section and outputs the set arbitrary reference value to the first difference detection section 401. The first difference detection section 401 uses the arbitrary reference value for the next input value.

The control section output section 406 determines the direction of increase/decrease from the control value in the control section to which the preceding input value belongs according to the position information from the position confirmation section 402 and when the input value variation width from the control section variation calculation section 403 exceeds the control section, it applies a calculation in the direction of increase/decrease to the control value in the control section to which the preceding input value belongs, outputs the calculation result as the control value in the control section to which the input value this time belongs and stores the calculation result as the control value for the next input value.

Thus, when the input value operating variation width is an arbitrary width in a plurality of control sections, this embodiment can determine a difference between the input value this time and an arbitrary reference value in the control section to which the preceding input value belongs, detect the input value variation width from the control value in the control section to which the preceding input value belongs from the difference result and output the control value according to the detected input value variation width. Therefore, when each control section is an arbitrary variation width, only one comparison operation is required in each hysteresis control section and it is possible to perform desired hysteresis control, capable of determining the control value without the necessity to change the set value and also detect an input value operation variation extending over the control sections while performing hysteresis control.

Embodiment 3

Embodiment 3 will describe a case where when input value operating variation widths are equal across a plurality of control sections, respective arbitrary reference values are set at a position at which each control section is divided into two equal control widths.

Figure 7:
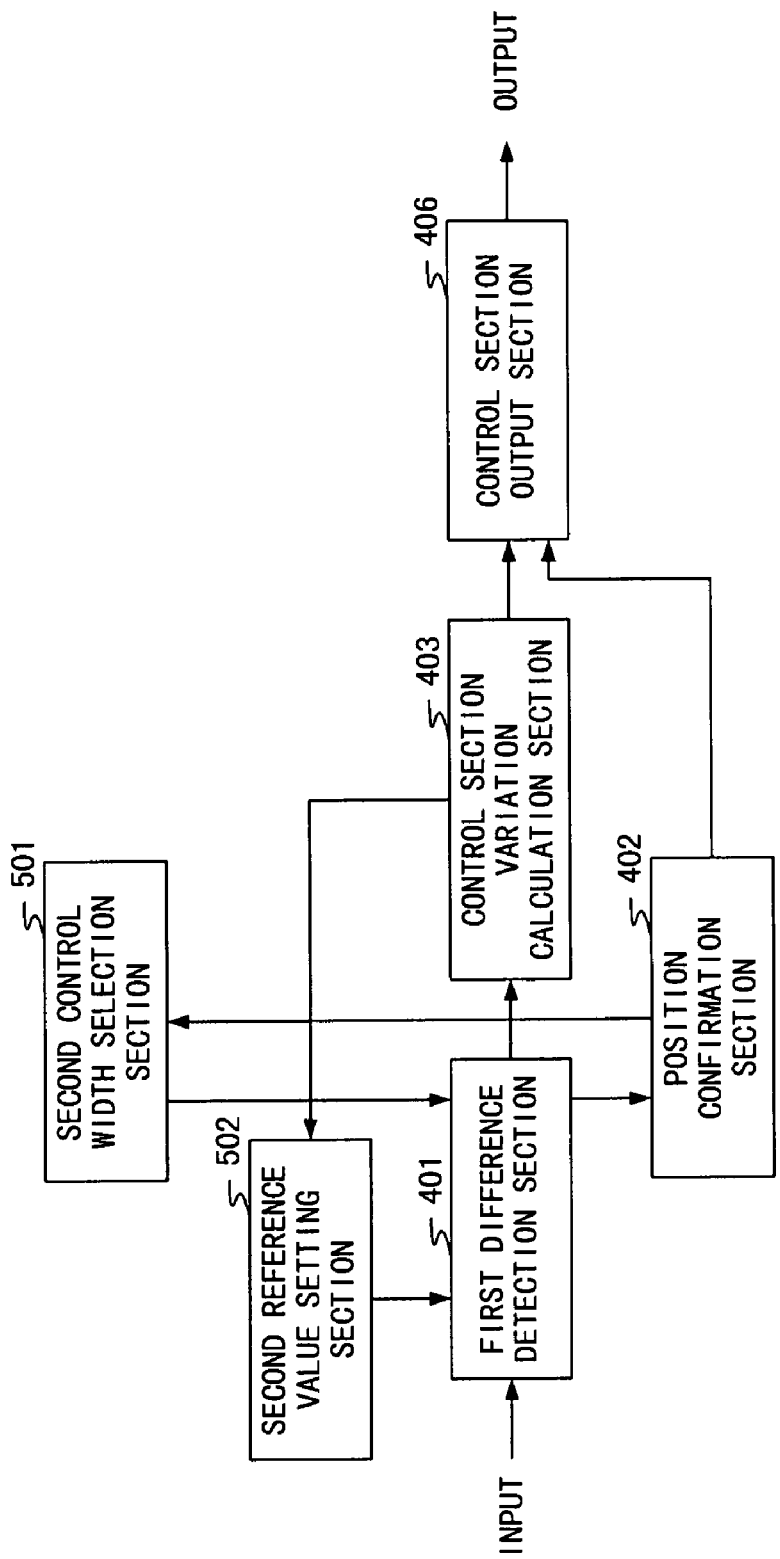
FIG. 7 is a block diagram showing the configuration of a hysteresis control apparatus according to Embodiment 3 of the present invention.

FIG. 7 is a block diagram showing the configuration of a hysteresis control apparatus according to Embodiment 3 of the present invention. In FIG. 7, the components identical or equivalent to those in the configuration shown in FIG. 6 are assigned the same reference numerals. Here, mainly parts related to this Embodiment 3 will be explained.

The hysteresis control apparatus according to Embodiment 3 shown in FIG. 7 is provided with a second control width selection section 501 instead of the first control width selection section 404 in the configuration shown in FIG. 6 and a second reference value setting section 502 instead of the first reference value setting section 405.

In FIG. 5, the control sections may have the same size or different sizes, but the control width 1 has the size different from that of the control width 2. On the contrary, the respective control sections in this embodiment have the same size and the second reference value setting section 502 sets an arbitrary reference value at a position (central position) where the respective control sections have the two identical control widths.

Therefore, the second control width selection section 501 does not have two control widths to be selected for each control section but simply has two control widths which are commonly applicable to the respective control sections to be selected.

The operation of the hysteresis control apparatus in the above described configuration will be explained below.

The second control width selection section 501 selects either a control width on the side smaller or a control width on the side greater than the arbitrary reference value in the control section based on the control section information from the control section variation calculation section 403 and position information from the position confirmation section 402 and outputs the selected control width to the first difference detection section 401.

Thus, even when the two control widths in the respective control sections are equal, it is possible to calculate a difference between the input value this time and the arbitrary reference value in the control section to which the preceding input value belongs, detect the input value variation width from the control value in the control section to which the preceding input value belongs from the difference result and output the control value according to the detected input value variation width.

At this time, when two control widths in each control section are the same, the second control width selection section 501 only needs to have two control widths; a control width on the side greater and a control width on the side smaller than the arbitrary reference value, requiring only a small number of control widths to be selected.

That is, as the control widths provided to be selected, it is only necessary to keep the control width on the side greater and the control width on the side smaller than the arbitrary reference value common to the respective control sections, and therefore it is possible to perform control with two values for when an input value is higher than the arbitrary reference value and when an input value is lower than the arbitrary reference value and thereby simplify the configuration.

Embodiment 4

Embodiment 4 will describe a case where an arbitrary reference value is set at a position where a plurality of control sections are divided into two equal parts when input value operating variation widths are equal across a plurality of control sections.

Figure 8:
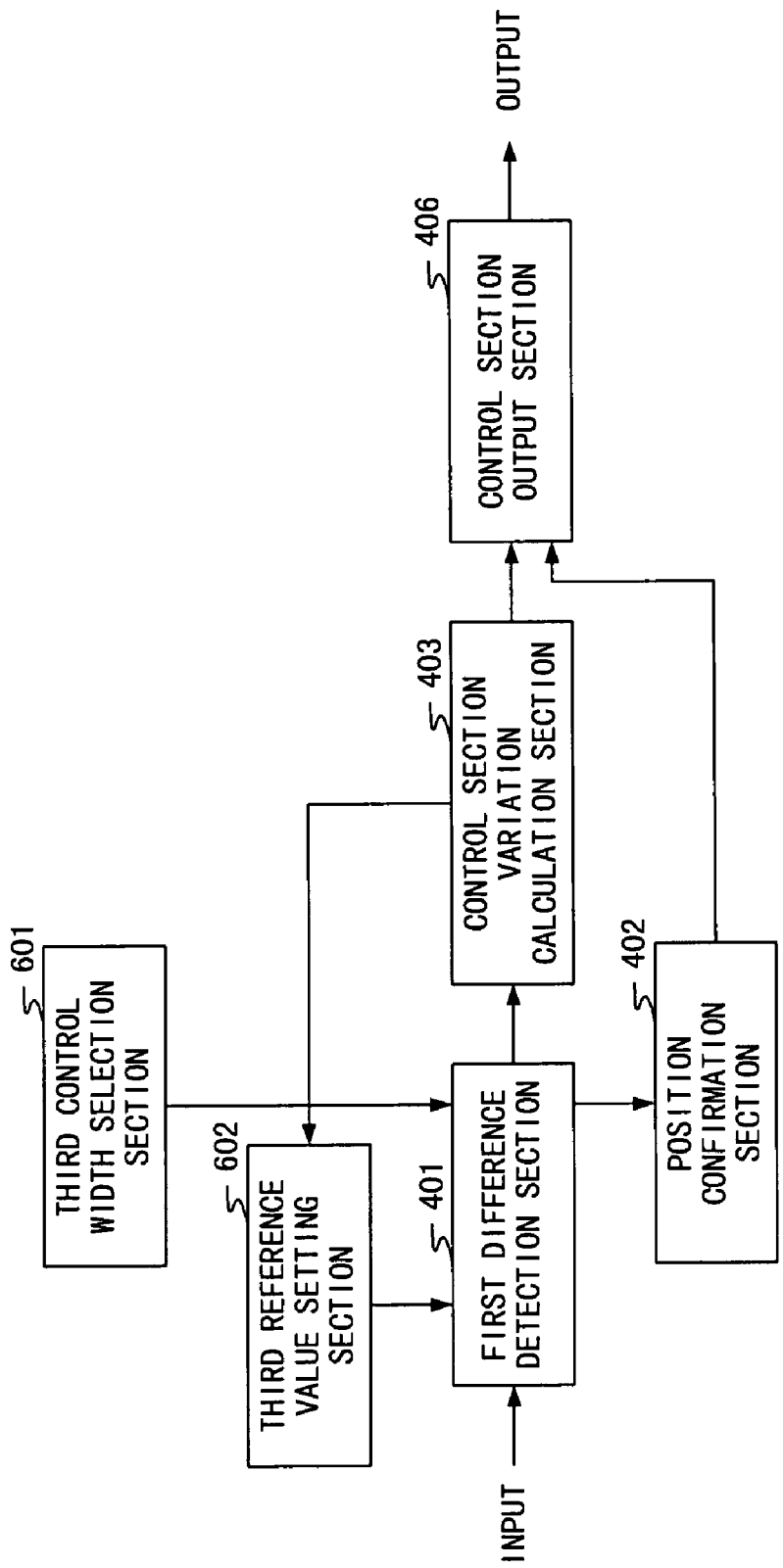
FIG. 8 is a block diagram showing the configuration of a hysteresis control apparatus according to Embodiment 4 of the present invention.

FIG. 8 is a block diagram showing the configuration of a hysteresis control apparatus according to Embodiment 4 of the present invention. In FIG. 8, the components identical or equivalent to those in the configuration shown in FIG. 6 are assigned the same reference numerals. Here, mainly parts related to this Embodiment 4 will be explained.

The hysteresis control apparatus according to Embodiment 4 shown in FIG. 8 is provided with a third control width selection section 601 instead of the first control width selection section 404 in the configuration shown in FIG. 6 and a third reference value setting section 602 instead of the first reference value setting section 405.

In FIG. 5, the control sections may have the same size or different sizes, but the control width 1 has the size different from that of the control width 2. On the contrary, the respective control sections in this embodiment have the same size and the third reference value setting section 602 sets an arbitrary reference value at a central position of all the control sections.

Furthermore, the third control width selection section 601 outputs control widths which are fixed all the time independently of positional relationships detected by a position confirmation section 402. That is, all the control sections have the same size, and therefore the control width here is the overall width of one control section.

The operation of the hysteresis control apparatus in the above described configuration will be explained below.

The third control width selection section 601 outputs a control width which is always constant up to the neighboring control section irrespective of the positional relationship detected by the position confirmation section 402 to a first difference detection section 401.

The first difference detection section 401 calculates a difference (first difference result) between an arbitrary reference value which is set in the center of all control sections by the third reference value setting section 602 and the input value this time, subtracts one control width output by the third control width selection section 601 from the first difference result to obtain a second difference result and gives the respective difference results to the control section variation calculation section 403.

Thus, according to this Embodiment 4, even when control sections have the same size and are treated as one fixed control width and an arbitrary reference value is set as a central position value for all control sections, it is possible to calculate a difference between an input value this time and an arbitrary reference value in the control section to which the preceding input value belongs, detect an input value variation width from the control value in the control section to which the preceding input value belongs from the difference result and output the control value according to the detected input value variation width.

At this time, if the respective control sections have the same size and are treated as one fixed control width and when an arbitrary reference value is set as the central value of all the control sections, only one arbitrary reference value needs to be set by the third reference value setting section 602. Furthermore, the third control width selection section 601 only needs to have one control width to be selected.

Thus, only one arbitrary reference value needs to be set and only one control width needs to be prepared as the one to be selected, and therefore it is possible to further simplify the configuration.

Embodiment 5

Embodiment 5 will describe a case where a result of dividing a difference result by a control width is used as an input value variation width as the method for calculating an input value variation width extending over control sections.

Figure 9:
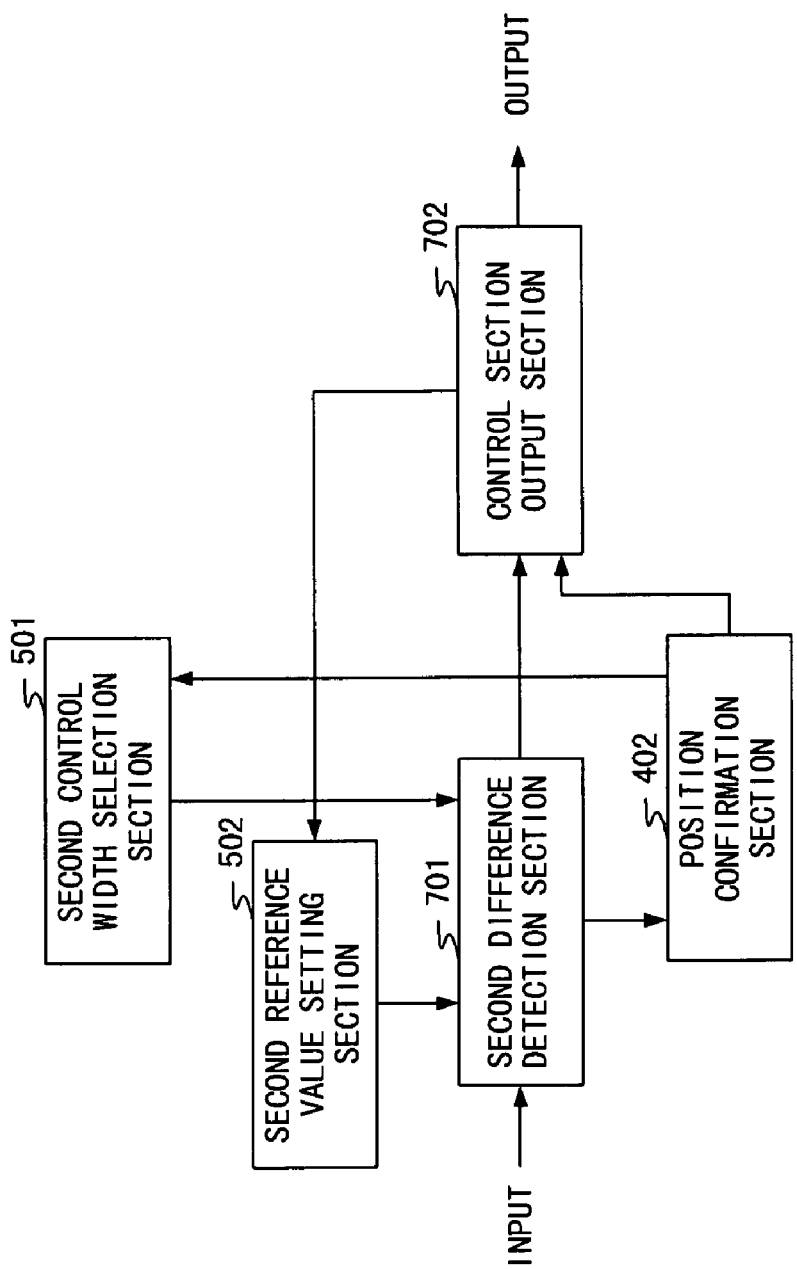
FIG. 9 is a block diagram showing the configuration of a hysteresis control apparatus according to Embodiment 5 of the present invention.

FIG. 9 is a block diagram showing the configuration of a hysteresis control apparatus according to Embodiment 5 of the present invention. In FIG. 9, the components identical or equivalent to those in the configuration shown in FIG. 7 are assigned the same reference numerals. Here, mainly parts related to this Embodiment 5 will be explained.

The hysteresis control apparatus according to Embodiment 5 shown in FIG. 9 is provided with a second difference detection section 701 instead of the first difference detection section 401 in the configuration shown in FIG. 7. Furthermore, the control section variation calculation section 403 is omitted and a control section output section 702 is provided instead of the control section output section 406.

The second difference detection section 701 divides the difference between an arbitrary reference value set by a second reference value setting section 502 and an input value this time by a control width output by a second control width selection section 501.

The control section output section 702 receives the output of the second difference detection section 701 and the output of the position confirmation section 402. The second reference value setting section 502 obtains control section information from the control section output section 406.

The operation of the hysteresis control apparatus in the above described configuration will be explained below.

The second difference detection section 701 calculates a difference (first difference result) between an arbitrary reference value set by the second reference value setting section 502 and an input value this time and divides the first difference result by the control width output by the second control width selection section 501 to calculate a second difference result and give the second difference result to the control section output section 406.

The control section output section 702 determines a direction of increase/decrease from a control value in the control section to which the preceding input value belongs from the position information from the position confirmation section 402, regards the second difference result (division result) at the second difference detection section 701 as an input value variation width, outputs control section information obtained from the input value variation width to the second reference value setting section 502, applies a calculation in the direction of increase/decrease to the control value in the control section to which the preceding input value belongs, outputs the calculation result as a control value this time and stores the calculation result as the next input value control value.

Thus, when two control widths in each control section are the same, this embodiment can calculate a difference of an input value this time and preceding input value from the arbitrary reference value, divide the difference result by either one control width to detect an input value variation width from the control value in the control section to which the preceding input value belongs and output the control value according to the detected input value variation width.

In Embodiments 2 to 4, the difference detection section calculates an input value variation width, but the present invention may also be adapted so that the control section variation calculation section directly calculates the input value variation width. The method of calculating the input value variation width shown in Embodiment 5 through a division operation may also be used in Embodiments 2 to 4 instead of a subtraction operation.

As explained above, when there is a plurality of control sections which are input value operating variation widths having hysteresis control sections at both ends, the present invention needs only one comparison operation in each hysteresis control section, can calculate control values without any need to change set values and detect input value variation widths extending over control sections while carrying out hysteresis control.

The present invention is not limited to the above described embodiments, and various variations and modifications may be possible without departing from the scope of the present invention.

This application is based on the Japanese Patent Application No. 2003-088162 filed on Mar. 27, 2003, entire content of which is expressly incorporated by reference herein.

What is claimed is:

1. A hysteresis control method in a control system having a plurality of control sections which are input value operating variation widths having hysteresis control sections at both ends, comprising:
    setting an arbitrary reference value which serves as a reference for deciding an existing position of a control width in a control section;
    calculating a difference between an input value this time and the arbitrary reference value in the control section to which a preceding input value belongs;
    generating position information indicating a positional relationship between the input value this time and the arbitrary reference value in the control section to which the preceding input value belongs from a difference result calculated;
    determining a direction of increase/decrease from a control value of the control section to which the preceding input value belongs from the position information;
    calculating an input value variation width extending over the control sections from the difference result and the control width in the control section to which the preceding input value belongs; and
    calculating the control value for the input value this time from the input value variation width and the direction of increase/decrease.

2. A hysteresis control apparatus comprising:
    a reference value setting section that sets an arbitrary reference value which serves as a reference for deciding an existing position of a control width in a control section of a plurality of control sections which are input value operating variation widths having hysteresis control sections at both ends;
    a difference detection section that calculates a difference between an input value this time and the arbitrary reference value in the control section to which a preceding input value belongs;
    a position information generation section that generates position information indicating a positional relationship between the input value this time and the arbitrary reference value in the control section to which the preceding input value belongs from a difference result calculated by said difference detection section;
    a control width selection section that selects the control width in the control section to which the preceding input value belongs;
    an input value variation width calculation section that calculates an input value variation width extending over the control sections from the difference result calculated by said difference detection section and a control width selected and output by said control width selection section; and
    a control value output section that calculates a control value for the input value this time from the input value variation width and a direction of increase/decrease from the control value in the control section to which the preceding input value belongs obtained from the position information.

3. The hysteresis control apparatus according to claim 2, wherein when the input value operating variation width is an arbitrary width in a plurality of control sections,
    said reference value setting section sets the arbitrary reference value at a position at which the control section specified by control section information is divided into a first control width and a second control width as an arbitrary reference value in the control section to which the preceding input value belongs, said control width selection section outputs the control width which is determined by the position information out of the first control width and the second control width specified by the control section information as the control width in the control section to which the preceding input value belongs, and said input value variation width calculation section outputs the control section information when the input value variation width is calculated.

4. The hysteresis control apparatus according to claim 3, wherein said input value variation width calculation section subtracts the control width in the control section to which the preceding input value belongs from the difference result calculated by said difference detection section and calculates the input value variation width from the number of subtractions until the subtraction result falls below the control width.

5. The hysteresis control apparatus according to claim 3, wherein said input value variation width calculation section regards the result of dividing the difference result calculated by said difference detection section by the control width in the control section to which the preceding input value belongs as the input value variation width.

6. The hysteresis control apparatus according to claim 2, wherein when the input value operating variation widths are the same across a plurality of control sections, said reference value setting section sets the arbitrary reference value at a position at which control sections are divided into equal control widths as an arbitrary reference value in the control section to which the preceding input value belongs, and the control width selection section outputs the control width which is determined by the position information out of the two equal control widths in the control section as a control width in the control section to which the preceding input value belongs.

7. The hysteresis control apparatus according to claim 6, wherein said input value variation width calculation section subtracts the control width in the control section to which the preceding input value belongs from the difference result calculated by said difference detection section and calculates the input value variation width from the number of subtractions until the subtraction result falls below the control width.

8. The hysteresis control apparatus according to claim 6, wherein said input value variation width calculation section regards the result of dividing the difference result calculated by said difference detection section by the control width in the control section to which the preceding input value belongs as the input value variation width.

9. The hysteresis control apparatus according to claim 2, wherein when the input value operating variation widths are the same across a plurality of control sections, said reference value setting section sets the arbitrary reference value at a position at which all of the plurality of control sections are divided into two equal parts as an arbitrary reference value in the control section to which the preceding input value belongs, and the control width selection section outputs one control width indicating the width of the control section as the control width in the control section to which the preceding input value belongs.

10. The hysteresis control apparatus according to claim 9, wherein said input value variation width calculation section subtracts the control width in the control section to which the preceding input value belongs from the difference result calculated by said difference detection section and calculates the input value variation width from the number of subtractions until the subtraction result falls below the control width.

11. The hysteresis control apparatus according to claim 9, wherein said input value variation width calculation section regards the result of dividing the difference result calculated by said difference detection section by the control width in the control section to which the preceding input value belongs as the input value variation width.

12. The hysteresis control apparatus according to claim 2, wherein said input value variation width calculation section subtracts the control width in the control section to which the preceding input value belongs from the difference result calculated by said difference detection section and calculates the input value variation width from the number of subtractions until the subtraction result falls below the control width.

13. The hysteresis control apparatus according to claim 2, wherein said input value variation width calculation section regards the result of dividing the difference result calculated by said difference detection section by the control width in the control section to which the preceding input value belongs as the input value variation width.

14. A hysteresis control method, comprising:
calculating a difference between a first input value and an arbitrary reference value, the arbitrary reference value corresponding to a first range of input values, within which a preceding input value, which precedes the first input value, falls;
generating position information based on whether the first input value is greater than or less than the arbitrary reference value;
determining an increase/decrease direction based on the position information;
calculating a second range of input values based on the calculated difference between the first input value and the arbitrary reference value, and based on a control width corresponding to the first range of input values; and
calculating a control value for the first input value based on the calculated second range of input values and the increase/decrease direction.

15. A hysteresis control method according to claim 14, further comprising determining the control width based on the position information.

16. A hysteresis control method according to claim 14, further comprising subtracting the control width from the calculated difference between the first input value and the arbitrary reference value one or more times until a result of the one or more subtractions is less than the control width, wherein the second range of input values is calculated based on the number of subtractions.

17. A hysteresis control method according to claim 14, wherein the second range of input values is calculated by dividing the calculated difference between the first input value and the arbitrary reference by the control width.

* * * * *